United States Patent Office 3,052,275
Patented Sept. 4, 1962

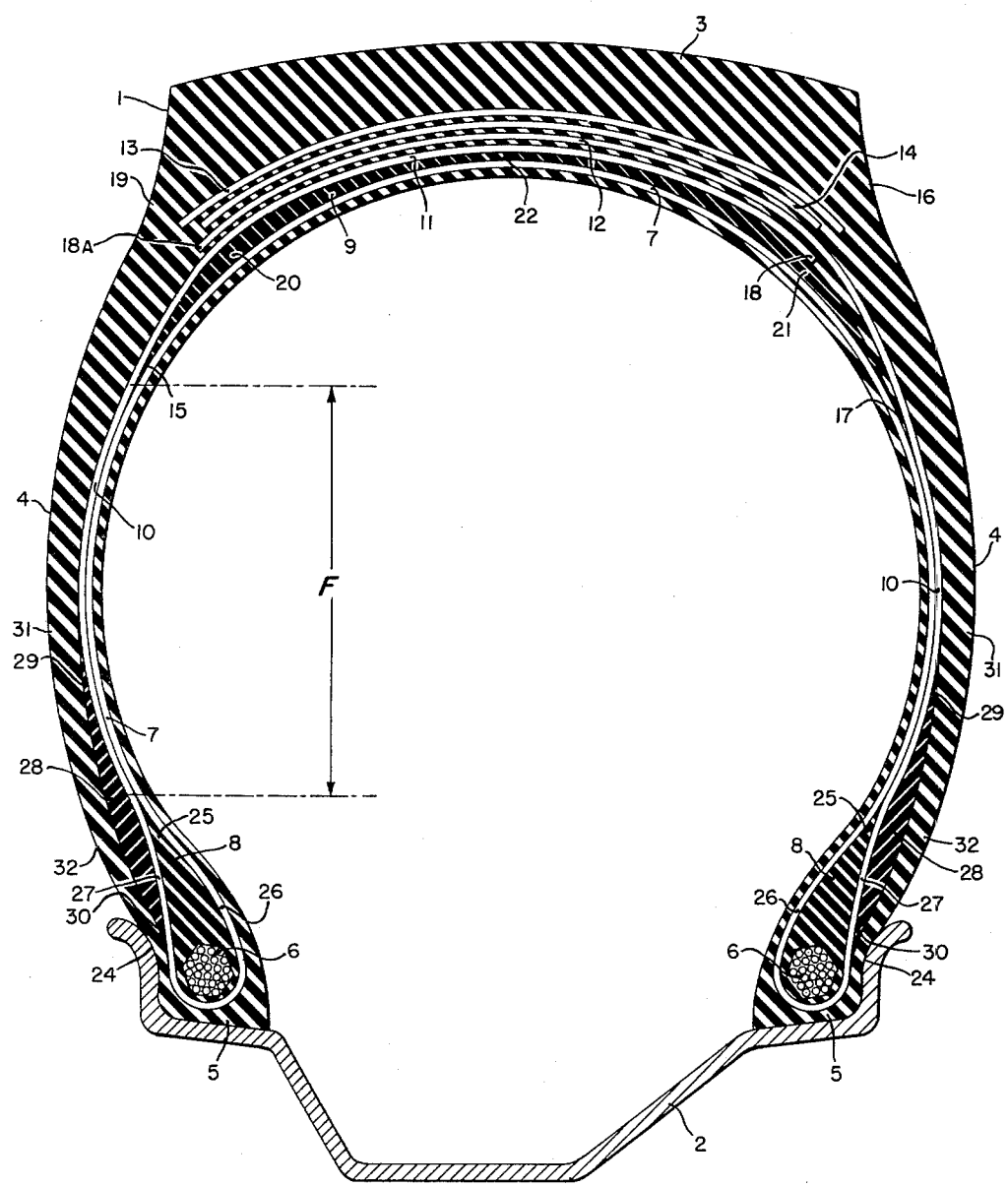

3,052,275
PNEUMATIC TIRE
Edgar W. Hylbert, Jr., Akron, Ohio, assignor to The Goodyear Tire & Rubber Company, Akron, Ohio, a corporation of Ohio
Filed May 12, 1959, Ser. No. 812,674
7 Claims. (Cl. 152—354)

This invention relates to a pneumatic tire casing and particularly to a pneumatic tire casing made of wire cords and made with the so-called "belted" construction.

Belted tire constructions, such for example as shown in U.S. Patent 2,493,614, are advantageous because of their substantially improved tread wear. Such tires are made with the cords of the plies extending substantially radially of the tire and with a sufficiently rigid and undeformable tread and breaker construction which permits the tread to pass through the road contact area with a minimum of scuffing and squirming. Since such tires are made with substantially radial plies there is little pantographing of the plies as the tire rotates through the road contact area and the radial plies are flexed in a direction axially of the tire during each revolution thereof and flex stresses tend to concentrate in the shoulder and bead areas of the tire, making such tires susceptible to ply separations in the shoulder and bead areas.

An object of this invention is to provide a radial ply wire tire of a belted construction having improved resistance to ply separation in the shoulder and bead areas of the tire.

Another object of the present invention is to provide a pneumatic tire of the character described in which all ply endings are eliminated in the bead area of the tire and in which flex concentrations in the bead and shoulder areas of the tire are reduced.

A further object of the invention is to provide a pneumatic tire of the character described formed of a single ply of parallel wire cords having improved resistance to ply separation in the bead and shoulder area thereof.

For a better understanding of the invention reference should be made to the accompanying description and drawings in which FIG. 1 is a sectional view of a tire casing embodying the invention.

Referring to the drawing numeral 1 indicates a tire casing mounted on a rim 2 and having a tread portion 3, a pair of sidewalls 4 and a pair of bead portions 5. A bead ring 6 made of a plurality of turns of wire is positioned within each bead portion 5 of the tire.

The tire is formed on a building drum of the usual type by applying thereto a single ply of rubberized cord fabric, preferably made of metal wire, with the ends extending beyond the ends of the drum. The central portion of the ply forms the radially inner reinforcing ply 7 of the tire. The bead rings 6, inner apex strips 8 and cushion strip 9 are then applied and the ends 11 and 12 of the ply are turned radially outward around the bead 6, apex 8 and cushion strip 9, which is in the crown of the tire, to form the radially outer reinforcing ply 10 of the tire. The ends 11 and 12 of the ply 10 overlap above the cushion strip 9. After application of the outer apex 28 and sidewalls 31, the green tire carcass is inflated or otherwise formed into toroidal shape and the breakers 13 and 14 and tread 3 are then applied.

In the completed tire the outer ply 10 is formed by the continuation of the cords of the inner ply 7 around the bead 6 across the sidewall 4 of the tire and into the crown thereof above cushion strip 9. The end 11 of the outer ply 10 extends from the sidewalls 4 across the edge 15 of the cushion 9 and terminates at 18 in the opposite shoulder area 16. On the other hand, the end 12 of the outer ply 10 crosses the edge 17 of the cushion 9, extends radially outward of the end 11 and terminates at 18a in the shoulder area 19 so that the ends 11 and 12 of the outer ply 10 are overlapped in the crown portion of the tire and above the cushion 9.

The cushion 9 is made of relatively soft gum rubber. The hardness of the rubber of cushion 9 is less than that of the rubber compound of the sidewalls 4 which has a Shore A hardness of 60 and a modulus of elasticity at 300% elongation of approximately 2100 p.s.i. Preferably the Shore A hardness of cushion 9 is approximately 50, and the modulus of elasticity at 300% elongation is 700 p.s.i.

The tire assembly includes two breaker plies 13 and 14 having parallel cords of metal wire with the cords in the alternate breakers extending in opposite directions. The breaker plies 13 and 14 are positioned above the overlapping ends 11 and 12 of the ply 10. The breaker plies are essentially equal in width to the width of the tread surface although preferably the outer breaker 13 is wider than the inner breaker 14.

The cushion 9 is of substantial thickness in the portions 20 and 21 located adjacent the shoulder areas 16 and 19 of the tire and tapers respectively from said portions 20 and 21 towards the center portion 22 and edges 15 and 17 of the cushion. The cushion 9 thereby separates the overlapping ends 11 and 12 of the outer ply 10 from the inner ply 7 so that the overlapping portions 11 and 12 of the outer ply 10 may act independently of the inner ply 7 in the crown area. Secondly, the cushion 9 prevents localized flexing in the shoulder areas 16 and 19 of the tire and provides a more uniform graduation of flexing in the shoulder areas with the result that separation of the plies in the crown of the tire is substantially reduced.

The rubber inner apex strips 8 are substantially wedge shaped in cross section and extend from the beads 6 to a position substantially above the rim flange and rim flange engaging portion 24 of the tire. In cross section the inner apex strip 8 has converging faces so that it decreases in thickness towards the end 25 of the inner apex 8 so that the cords 26 and 27 in the bead portion 5 converge gradually towards each other from the bead 6 towards the sidewall area 4 so that inner ply 7 and the outer ply 10 are contiguous with respect to each other from the end 25 of the apex 8 to the edge 23 of the cushion 9. Preferably, the inner ply 7 and outer ply 10 in the flex area of the tire, indicated by the broken lines and designated by the letter "F," are as close together as possible so that the two plies in the flex area F lie in substantially the same curved linear plane. It has been found that if the skimmed coating of rubber applied to the single ply from which the tire of this invention is made is reduced, at least on one side thereof and said one side is stitched together in face to face relationship, the cords of the ply 10 in the area F will intermesh with the cords of the ply 7 in the area F when the cords extend 90° with respect to the axis of the tire, and thus will in fact be positioned in a common curvilinear plane.

An outer apex strip 28 is secured to each bead portion between the sidewall strips 31 and the cords 27 and is positioned so that the central portion thereof is adjacent the edge 25 of the inner apex. The outer apex strip 28 in cross section is of substantial thickness at the central portion and tapers towards each edge 29 and 30 thereof. The outer apex strips 28 are made of a rubber having a hardness substantially greater than the hardness of the rubber sidewall strips 31 so that flex concentrations in the area 32 immediately above the rim flange contact area 24 of the tire are substantially reduced and radial extent of the flex area F of the tire is likewise reduced. Preferably, the outer apex strips 28 have a Shore A hardness greater than 65 and a modulus of elasticity, at 300% elongation, of about 1400 p.s.i.

As described, the overlapping ends 11 and 12 terminate respectively in the shoulder area 16 and 19. However, the overlapping ends 11 and 12 may be shortened respectively so that they overlap in the crown of the tire only to a limited extent at the mid circumferential center line of the tire. If additional breakers are used, it may be desirable to further shorten the ends 11 and 12 so that the end 11 terminates beneath the breakers and in butting relationship to tie end 12 so that the ends 11 and 12 form a butt splice beneath the breaker plies 13 and 14.

To demonstrate the effectiveness of the present construction a number of tires were built and tested extensively in direct comparison with control tires constructed according to U.S. Patent 2,493,614. In one series of tests, the tires of the invention were subjected to a ply separation test in which the tire is run on the outer periphery of a large driven cylinder at high loads which submits the carcass and tread to extreme deflection due to the convexity of the cylinder so that failure of the tire occurs as a separation in the tread, breaker or shoulder area. Carcass separation did not occur in tires of this invention until an average of some 7000 miles, whereas the corresponding control tires, tested under identical conditions, lasted on the average of 5000 miles, an improvement of about 40% in resistance to carcass separation.

Other comparative tests were conducted to determine the resistance to separation in the bead area of the tire. In this test the tires were run on the internal surface of the driven cylinder at high loads and high inflation which places excessive stresses on the bead regions of the tire but not on the tread regions since the tread is not deflected excessively due to the concavity of the cylinder. Bead separation did not occur in tires of this invention until an average of some 7000 miles whereas the corresponding control tires tested under identical conditions, lasted only 5000 miles on the average before failure, an improvement of about 40% in resistance to bead separation.

The term "radial ply" or "radially extending cords" as used herein comprehends not only plies having cords which extend radially or 90° with respect to the axis of the tire, but also cords or plies which extend at 10° relative to a radial plane of the tire.

While certain representative embodiments and details have been shown for the purpose of illustrating the invention, it will be apparent to those skilled in the art that various changes and modifications may be made therein without departing from the spirit or scope of the invention.

I claim:

1. A pneumatic tire comprising a body of resilient rubber-like material including a pair of rubber covered sidewalls, a single bead ring in each bead, at least one breaker ply, and a tread, said body comprising a layer of parallel reinforcing cords extending radially of the tire at its inner face and anchored around each bead ring to form an inner ply, the cords of said layer extending from the beads outwardly of said inner ply, the endings of said cords extending into at least a butting relationship beneath said breaker to form an outer ply, an inner apex strip located immediately above each bead ring and encased within the inner and outer plies, and an outer apex strip located externally of the inner and outer plies but engaging said outer ply immediately above the rim flange engaging portion of the tire, said outer apex strip extending radially outward of said inner apex strip.

2. A pneumatic tire as claimed in claim 1 in which said inner apex strips have converging faces extending above the rim engaging portion of the tire, said inner and outer plies being contiguous with each other only in each sidewall from a point immediately above the inner apex strip radially outward to a point above the sectional center line of the tire.

3. A pneumatic tire as claimed in claim 1 in which the outer apex strip consists of rubber having a hardness greater than the hardness of rubber comprising said sidewalls.

4. A pneumatic tire as claimed in claim 1 in which said inner and outer plies are separated from each other in the crown area from one shoulder to the other shoulder of the tire by a layer of rubber of substantial thickness having a hardness less than that of said sidewalls.

5. A pneumatic tire as claimed in claim 1 in which said inner and outer plies are separated from each other in the crown area of the tire by a layer of rubber of substantial thickness having a substantially greater thickness in the shoulder area of the tire.

6. A pneumatic tire as claimed in claim 1 in which said inner and outer plies are intermeshed with respect to each other into a common curvilinear plane only in the sidewall area of the tire from a point above the internal apex to a point at the radially inward edge of a layer of rubber extending from one shoulder to the other shoulder in the crown area of the tire and separating the inner and outer plies in the crown area of the tire.

7. A pneumatic tire comprising a body of resilient rubber-like material including a pair of rubber covered sidewalls, a single bead ring in each bead portion, at least one breaker ply, and a tread, said body comprising a layer of parallel reinforcing wire cords extending radially of the tire at its inner face and anchored around each bead ring to form an inner ply, the cords of said layer extending around the beads outwardly of said inner ply, the ending of said cords extending into an overlapping relationship beneath said breaker to thereby form an outer ply in the sidewalls of the tire in which the ply endings of the outer ply overlap each other at least in a portion of the crown area of the tire, an inner apex strip located immediately above each bead ring and encased within the inner and outer plies, and an outer apex strip located externally of the inner and outer plies but adjacent said outer ply, said outer apex extending from immediately above the rim flange engaging portion to a location radially outward of said inner apex strip.

References Cited in the file of this patent

UNITED STATES PATENTS

| | | |
|---|---|---|
| 1,530,574 | Paull | Mar. 24, 1925 |
| 1,575,966 | Brittain | Mar. 9, 1926 |
| 1,769,694 | Jenkinson | July 1, 1930 |
| 2,225,042 | Elliott | Dec. 17, 1940 |
| 2,752,980 | Riggs | July 3, 1956 |

FOREIGN PATENTS

| | | |
|---|---|---|
| 869,603 | Germany | June 11, 1953 |
| 1,088,973 | France | Sept. 22, 1954 |
| 730,878 | Great Britain | June 1, 1955 |